United States Patent Office 2,779,791
Patented Jan. 29, 1957

2,779,791
ALKINYL AND ALKENYL SUBSTITUTED DI-CYCLOHEXYL ETHANE COMPOUNDS

Erich M. H. Radde, New York, N. Y.

No Drawing. Application November 20, 1953,
Serial No. 393,502

Claims priority, application Germany December 2, 1949

4 Claims. (Cl. 260—586)

This invention relates to dicyclohexyl ethane compounds, and more particularly to dicyclohexyl ethane compounds substituted by alkyl residues, and to a method of producing same.

The present invention is a continuation-in-part application of my copending application Serial No. 193,275, filed October 31, 1950, relating to "Dicyclohexyl Ethane Compounds and a Method of Making Same," now Patent No. 2,661,369. Said co-pending application refers to (p-cyclohexenonyl)-(p-hydroxy aceto cyclohexanyl)-diethyl ethane compounds of the following formula

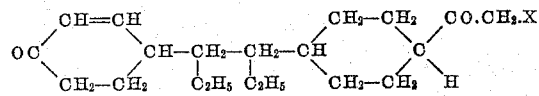

wherein X represents a member selected from the group consisting of a hydroxyl group and an acyloxy group.

It is one object of this invention to provide compounds of the formula

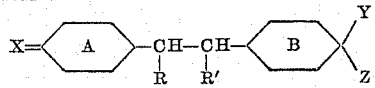

X represents a keto or a secondary alcohol group or a group convertible by hydrolysis into said keto or secondary alcohol group, Z indicates hydrogen or a hydroxyl group, and R and R' are alkyl radicals and especially ethyl radicals, and wherein rings A and/or B may contain double bonds, while Y represents an unsaturated aliphatic hydrocarbon residue with not more than 3 carbon atoms and especially an acetylene or an ethylene side chain.

A further object of this invention is to provide methods for producing said compounds by using compounds of the following formula as starting materials:

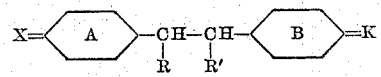

wherein X, R, and R' indicate the same group as stated above and K is a keto group, while rings A and/or B may contain double bonds. Such starting materials are described, for instance, in French Patent 872,058 which relates to hydroxyl ketones or diketones respectively of dicyclohexane dialkyl ethane compounds which are derived from the corresponding dialkyl stilbestrol compounds.

Other objects of this invention will be apparent from the specification and the claims attached thereto.

Compounds having the activity of the Corpus luteum hormone are obtained, for instance, by reacting a mono-keto derivative of a (cyclohexenonyl) (cyclohexanonyl)-diethyl ethane wherein, for instance, the keto group of the cyclohexenonyl is transformed into the semicarbazone group, with acetylene so as to form the corresponding ethinylcyclohexanonyl derivative and then reforming the second keto group. The starting material for this reaction is obtained, for instance, by producing first a keto derivative, such as a semicarbazone or a 2,4-dinitrophenyl-hydrazone of the (p-cyclohexenonyl) (p-cyclohexanolyl)-diethyl ethane according to example 8 of French Patent No. 872,058, and then oxidizing the alcohol group to the keto group which is then reacted with acetylene.

The reaction described proceeds according to the following formulas whereby A and B represent saturated cyclohexane rings of the following structural formula

while A' and B' represent unsaturated cyclohexane rings of the following structural formula

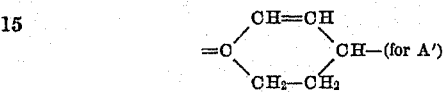

and

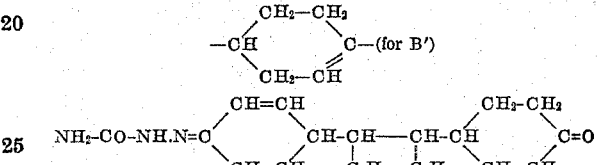

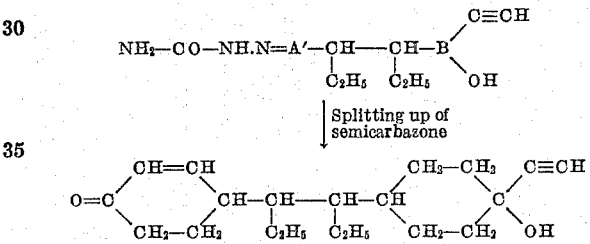

Said compounds with an unsaturated side chain in their molecule can be converted into hydroxy aceto cyclohexane compounds having adrenocortical hormone activity by reducing the (ethinyl cyclohexanolyl) (cyclohexanolyl) diethyl ethane compound obtained, by reduction, from the keto compound described above in the presence of a nickel catalyst to the corresponding vinyl compound. The secondary alcohol group in the outer cyclohexane ring is then oxidized to a keto group, the vinyl ketone is reacted with osmium tetroxide to introduce two hydroxyl groups at the vinyl double bond. The triolone compound obtained is converted into its diacetate. By vacuum distillation with zinc dust one molecule of acetic acid is split off, thereby forming (acetoxyacetocyclohexanyl) (cyclohexanonyl) diethyl ethane which, by bromination and splitting off hydrogen bromide, yields the corresponding cyclohexenonyl compound.

This reaction may be illustrated by the following formulas wherein A and B as well as A' and B' have the same meaning as stated above:

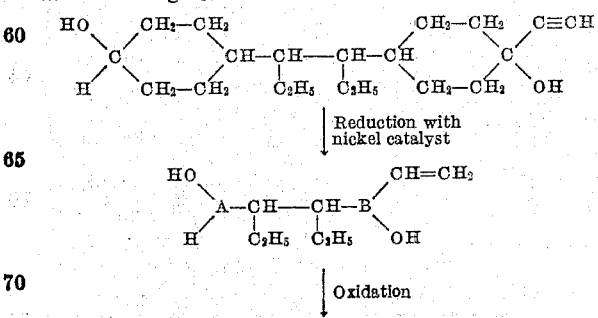

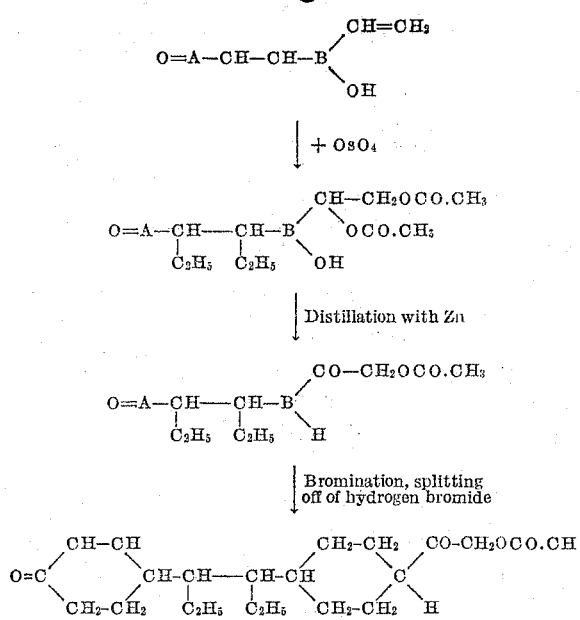

As can be seen from the foregoing, the present invention consists in principle in subjecting the starting material which has one free keto group to reactions as they are known to the art and especially in steroid hormone chemistry, whereby side chains are introduced into the molecule, said side chains corresponding in structure to the side chains present in said steroid hormones.

The following examples serves to illustrate the invention without, however, limiting the same thereto.

*Example*

Purified and dried acetylene is passed into 50 cc. of dry ether. To this solution there are added, drop by drop, a solution of 10 g. of potassium in 150 cc. of dry tertiary amyl alcohol, and a solution of 10 g. of (p-cyclohexenonyl-semicarbazone) (p-cyclohexanonyl) diethyl ethane obtained, for instance, from the semicarbazone of (p-cyclohexenonyl) (p-cyclohexanolyl) diethyl ethane according to Example 8 of French Patent No. 872,058, which is then oxidized to the monoketo derivative of the diketone, in 500 cc. of dry ether and 50 cc. of dry benzene, while stirring and introducing acetylene. Stirring and introduction of acetylene is continued for 5 hours. The reaction mixture is then acidified with saturated ammonium chloride solution containing hydrochloric acid and is extracted thoroughly with ether. The ethereal extract is washed, dried over sodium sulfate, and the solvents are distilled off by vacuum distillation, finally while passing a stream of carbon dioxide through the distillation apparatus. The distillation residue is purified by crystallization from methanol or any other suitable solvent. The semicarbazone is split up by reacting and heating the crude product in 10 times its amount of dioxane with 2 times its amount of 40% sulfuric acid for 1 hour at about 60° C. The reaction mixture is then diluted with about 4 times its volume of water while stirring and is allowed to stay over night whereby stirring is continued. The precipitate is filtered off, washed with water until no sulfate ions can be determined in the filtrate and the (cyclohexenonyl) (ethinyl cyclohexanol) diethyl ethane is purified by recrystallization. This compound exhibits Corpus luteum hormone activity.

Catalytic reduction of said ethinyl compound in the presence of a nickel catalyst yields (cyclohexenonyl) (ethenyl cyclohexanol) diethyl ethane which is an important intermediate in the manufacture of compounds having a $CH_3.CO$— or a $HOCH_2.CO$— side chain.

Of course, many changes and variations may be made by those skilled in the art in the reaction conditions, the reagents used, the methods of purifying the reaction products, and the like, in accordance with the principles set forth herein and in the claims annexed hereto. Thus, for instance, instead of the acetyl compounds, esters with other acids, such as propionic acid, benzoic acid, phosphoric acid, stearic acid and others, or ethers, such as the methyl ether and others may be used as starting or intermediate compounds or may be produced as final products. The oxidation of the secondary alcohol group to the keto group may be carried out with other oxidizing agents instead of chromic acid, such as with permanganate, by the Meerwein-Ponndorf reaction and the like. The double bond in conjugation to the keto group may be introduced by other means; for instance, splitting off of hydrogen bromide may be effected by means of dimethyl aniline, quinoline, and others. The addition of acetylene to the cyclohexanone compound may be carried out in any other known manner. Acetylene, for instance, may be added in liquid ammonia solution. Splitting off water between the tertiary alcohol group and a neighboring methylene group in a cyclohexanolyl ring which contains a further substituent on the carbon atom carrying the tertiary alcohol group, may be effected by other means, as acetylchloride in acetic acid anhydride and others. Other catalysts than those mentioned, may be employed for hydrogenating the double bond produced on splitting off water between said tertiary hydroxyl group and the neighboring methylene group, for instance, platinum catalysts, or said hydrogenation may be carried out by chemical means. The ketonic intermediate and end products may be purified not only by fractional crystallization from suitable solvents, but also by converting them into insoluble ketonic condensation products, for instance, with thiosemicarbazide, phenylhydrazine and others, besides those mentioned in the example. The keto compound may be reformed from said ketonic derivatives not only by hydrolysis by means of acids and the like, but also by reacting said derivatives with other aldehydes or ketones, such as benzaldehyde and others.

When starting with (p-cyclohexanolyl) (p-cyclohexanonyl) diethyl ethane compounds or their esters and ethers, the corresponding ethinyl and ethenyl compounds are obtained which have a hydroxyl group or an ester or ether group in the one cyclohexane ring. Such compounds are also valuable intermediate products. The ester and ether residues of said compounds are those conventionally used in steroid chemistry for protecting hydroxyl groups. In place of acetylene there may also be used methyl acetylene to produce a compound with an alkine residue having three carbon atoms.

What I claim is:

1. (p-Cyclohexanonyl) (p-ethinyl cyclohexanolyl) diethyl ethane of the following formula

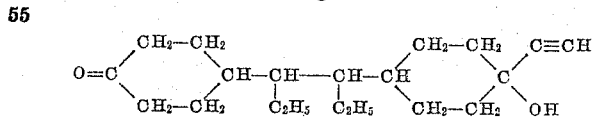

2. (p-Cyclohexenonyl) (p-ethinyl cyclohexanolyl) diethyl ethane of the following formula

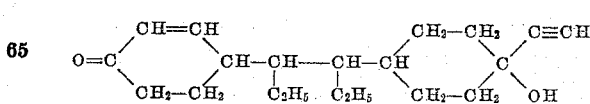

3. A di-(cyclohexyl)diethyl ethane compound of the following formula

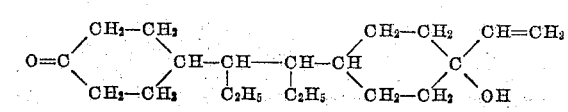

4. A (p-cyclohexenonyl)(p-cyclohexanolyl) diethyl ethane compound of the following formula
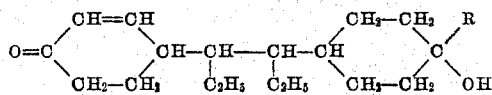
wherein R is an unsaturated aliphatic hydrocarbon residue with not more than three carbon atoms.
References Cited in the file of this patent
UNITED STATES PATENTS
| | | |
|---|---|---|
| 2,351,637 | Ruzicka et al. | June 20, 1944 |
| 2,359,935 | Nudenberg et al. | Oct. 10, 1944 |
| 2,392,864 | Schoeller et al. | Jan. 15, 1946 |